US005486435A

United States Patent [19]

Brochu et al.

[11] Patent Number: 5,486,435
[45] Date of Patent: Jan. 23, 1996

[54] ADDITIVES FOR EXTRUDING POLYMER ELECTROLYTES

[75] Inventors: Fernand Brochu, Longueuil; Michel Duval, Montreal, both of Canada

[73] Assignee: Hydro-Quebec, Montreal, Canada

[21] Appl. No.: 186,103

[22] Filed: Jan. 25, 1994

[51] Int. Cl.$^6$ ...................................... H01M 6/18
[52] U.S. Cl. .................. 429/192; 429/193; 264/211
[58] Field of Search ............................ 264/211; 429/192, 429/193

[56] References Cited

U.S. PATENT DOCUMENTS

| | | | |
|---|---|---|---|
| 4,303,748 | 12/1981 | Armand et al. | 429/192 |
| 4,357,901 | 11/1982 | Fagen, Jr. et al. | |
| 4,505,997 | 3/1985 | Armand et al. | |
| 4,578,326 | 3/1986 | Armand et al. | |
| 4,818,643 | 4/1989 | Cook et al. | 429/188 |
| 4,818,694 | 4/1989 | Watson et al. | |
| 5,207,959 | 5/1993 | Antikow et al. | 264/103 |
| 5,316,714 | 5/1994 | Yoneda et al. | 264/210.6 |
| 5,328,755 | 7/1994 | Mills et al. | 428/215 |

FOREIGN PATENT DOCUMENTS

| | | |
|---|---|---|
| 1269702 | 5/1990 | Canada. |
| WO92/02966 | 2/1992 | WIPO. |

OTHER PUBLICATIONS

2nd Int. Symp. Polym Electrolytes Scrosti Ed; (1990), Wieczorek et al. "Mixed Phase Solid Electrolytesa Bread Poly (Ethylene Oxide) Systems", 1990, pp. 339–346.

*Primary Examiner*—Prince Willis, Jr.
*Assistant Examiner*—M. Nuzzolillo
*Attorney, Agent, or Firm*—Oblon, Spivak, McClelland, Maier & Neustadt

[57] ABSTRACT

Preparation of an electrolyte film for lithium/polymer electrolyte batteries by extruding a powder mixture containing a polymer, a lithium salt and an additive consisting of an ultra fine powder of a metal oxide, such as silica, aluminum, or titanium oxide with a particle size between about 7 and 40 nm. The role of the additive is to prevent the formation of adhesive solid blocks in the powder mixture and to allow the introduction of this mixture in the extruder. Electrolyte compositions, electrolytes as well as electrochemical generators obtained according to the invention are also described.

8 Claims, No Drawings

ADDITIVES FOR EXTRUDING POLYMER ELECTROLYTES

BACKGROUND OF INVENTION a) Field of the Invention

The present invention concerns additives for obtaining non-adhesive powders for the extrusion of electrolytes of polymer electrolyte batteries, hereinafter ACEP. More specifically the invention relates to a process for the preparation of an electrolyte film for lithium/polymer electrolyte batteries. The invention also concerns compositions for the preparation of an electrolyte film for the batteries mentioned above, the electrolytes contained in these compositions as well as the electrochemical generators including these electrolytes.

b) Description of Prior Art

Lithium/polymer electrolyte ACEP batteries are manufactured by superposing three main types of films: a film of positive electrode containing a material which is electrochemically active such as vanadium oxide, a film of electrolyte comprising a polymer and a lithium salt, and a lithium film. Each of these films has a thickness between 15 and 50 μm, for a total thickness of elementary film of the battery of 100 to 150 μm. About thirty meters of elementary film 15 cm wide are typically required to give a battery of 100 wh.

The film of electrolyte is mainly manufactured by solvent coating, however melt extrusion is also considered because of its numerous advantages. The amorphous copolymers used in ACEP batteries can be easily extruded to provide an electrolyte without salt. Positive electrodes containing an excess of salt must then be prepared by solvent coating, but these are more difficult to obtain with the desired properties of uniformity and adhesion on the collector than positive electrodes containing a regular amount of salt.

When trying to extrude copolymers with a salt, the following problem occurs: when the copolymer powder is mixed with a lithium salt powder, large adhesive solid blocks of polymer-salt complex are obtained, which prevent the introduction of the mixture in the extruding screw, and which cannot be reduced in the form of pellets. The same problem appears with mixtures of salt and crystalline polymer of the polyethylene oxide type.

A partial solution consists in introducing the polymer and salt separately into the extruder, however, the measurement of the relative quantities of each of the powders is not very accurate and, moreover, since the powders have no time to mix perfectly, the films obtained are not very homogeneous.

According to the invention, an approach is proposed which consists in utilizing additives preventing the formation of solid adhesive blocks and enabling to obtain mixtures of polymer and salt in the form of fine powders which are easy to introduce into an extruder.

It is an object of the present invention to propose additives, based on ultra fine powders, whose granulometry is between about 7 and 40 nm, for example silica or other mineral compounds, for example oxides, which have no effects on the electrochemical performance of ACEP batteries.

The addition of silica or aluminum powders in ACEP electrolytes has been proposed by Wieczorek et al. (2nd Int. Symp. Polym. Elect., 1990, pp. 339–347) but only for the more conventional purpose of improving the mechanical and thermal properties of the electrolytes prepared by solvent coating, and with much larger particles (2 to 30 μm), which do not allow the above desired effects to be obtained when extruding the polymers and the lithium salts.

It is also an object of the invention to provide additives enabling to obtain non-adhesive powders of polymeric electrolyte-salt mixtures which may be introduced into an extruder to prepare said electrolytes by melt process.

Another object of the invention is the utilization of additives, for example based on pyrogenated silica powders of the AEROSIL™ type, consisting of ultra fine particles (7 to 40 nm), preferably chemically treated at their surfaces to eliminate siloxane or silanol polar groups.

The invention relates to a process for preparing an electrolyte film for lithium/polymer electrolyte batteries, by extrusion of a polymer and a lithium salt which can be used in said electrolyte. The process is characterized in that the extrusion of said polymer with said lithium salt is carried out in the presence of ultra fine powders of a metal oxide whose granulometry is between about 7 and 40 nm.

Preferably the metal oxides are selected from silicon, aluminum, and titanium oxides and pyrogenated silica is particularly suitable. The silica preferably is has one having a BET surface of 50 to 400 m$^2$/g and contain more than 99.8% of silica.

According to another preferred embodiment of the invention, a polymer powder is first mixed separately with some pyrogenated silica powder, a lithium salt powder is mixed separately with some pyrogenated silica powder, the two mixtures are combined and a last amount of pyrogenated silica powder is added, then, the final mixture is mixed and extruded.

The invention also concerns a composition for the preparation of an electrolyte film for lithium/polymer electrolyte batteries characterized in that it comprises a polymer and a lithium salt which can be used in these electrolytes and an ultra fine powder of metal oxides with particle sizes between about 7 and 40 nm.

The invention also concerns electrolytes and electrochemical generators manufactured from compositions according to the invention.

The families of polymers which can be used in ACEP electrolytes described in Armand U.S. Pat. No. 4,303,748, as well as the amorphous, crosslinkable or non-crosslinkable copolymers and terpolymers, described more in detail in U.S. Pat. Nos. 4,578,326, 4,357,901 and Canadian Pat. No. 1,269,702 are preferably used for the preparation of electrolytes according to the invention.

With respect to the lithium salts, the preferred families of salts are those used in ACEP electrolytes described in Armand U.S. Pat. No. 4,303,748, as well as the more elaborated salts based on terfluorosulfonimide of lithium (TFSI) or bisperhalogenoacyl or sulfonylimides of lithium (TFSM), crosslinkable or non-crosslinkable, described in U.S. Pat. Nos. 4,505,997, 4,818,694 and PCT WO92/02966 of Jul. 25, 1991.

The extrusion additives which are preferably used are the ultra fine powders ("fumes") of pyrogenated silica, commercially available from the Degussa Company under the trademark AEROSIL or from the Cabot Chemical Company under the trademark CABOSIL. The particles of non-treated silica have silanol and siloxane hydrophilic groups at their surfaces. The particles of silica which have been chemically treated with silane (AEROSIL type R) have hydrophobic $CH_3$ or other groups at their surfaces. The particles which have been treated are particularly suitable for electrochemical applications because they do not react with lithium and lead to ACEP batteries with better electrochemical performances.

These particles normally have a granulometry of 7 to 40 nm, a BET surface of 50 to 400 m²/g and contain more than 99.8% silica. Powders of the same type, except that they are made of aluminum, titanium or other metallic oxides are also suitable.

Although the preparation of powder mixtures presents no problem to one skilled in the art, it is preferred to proceed as follows. First, some polymer powder is mixed with a powder of, for example, AEROSIL to reduce the adhesive character of the polymer, some lithium salt powder is also mixed with AEROSIL powder to separate the grains of salt from one another. Then the two powder mixtures are mixed and some AEROSIL powder is added to complete the separation of the adhesive phases of polymer-salt complex. Of course, one could use any other metallic oxide powder.

The quantity of metal oxide powder, for example AEROSIL, which is required increases with the relative quantity of salt in the polymer and with the amorphous and adhesive character of the polymer-salt complex, as this will appear to one skilled in the art. Normally, 2% to 10% of AEROSIL by weight with respect to the polymer-salt complex enables to obtain the desired properties, with 5% as a typical value.

The invention will now be illustrated by the following non limiting examples:

EXAMPLE 1

A copolymer powder (Mw~200,000) is introduced into an Echlin double screw extruder of 3.8 cm diameter, heated at 160° C. The molten copolymer exits through a die 20 cm wide and is deposited on a polypropylene support in the form of a polymer film having a uniform thickness of about 30 μm.

EXAMPLE 2

In a container maintained under a dry atmosphere to prevent the absorption of water by the very hygroscopic lithium salt, 2.2 kg of lithium terfluorosulfonimide powder (TFSI) is added slowly to 10 kg of copolymer powder (Mw ~ 200,000), while continuously stirring the container on rollers. Large adhesive blocks of polymer-salt complex, 2 to 10 cm diameter are formed, which block the entrance of the extruder when attempts are made to introduce them therein.

EXAMPLE 3

A Warner and Pfilder double screw compounder is used to feed the extruding die. The copolymer powder is introduced at one end of the compounder and the lithium salt powder is introduced in the middle of the compounder, by means of screw type powder feeding devices controlled by measuring the weights introduced. A film of electrolyte about 30 μm thick is obtained, with local concentrations of salt clearly visible. Moreover the very fine powder of TFSI sticks on the walls of the feeding device and is difficult to control quantitatively.

EXAMPLE 4

10 kg of polymer powder (Mw ~200,000) and 0.2 kg of AEROSIL R 974 are introduced into a blender where they are stirred for 10 minutes. 2.2 kg of lithium salt TFSI and 0.2 kg of AEROSIL R 974 are treated in the same way during 10 minutes. The two mixtures are combined and stirred for minutes and 0.2 kg of AEROSIL R 974 is added and the mixture is stirred one last time for 10 minutes. A fine powder is obtained which is not sticky and which can easily be introduced into the extruder of example 1, heated at 80° C. in its first part and 100° C. in the die portion. An homogeneous film of electrolyte of 30 μm uniform thickness is obtained. An ACEP battery assembled with this electrolyte shows electrochemical performances comparable to those obtained by conventional solvent coating.

EXAMPLE 5

Example 4 is repeated with commercial polyethylene oxide (Mw ~200,000), a crystalline polymer. The results obtained are comparable to those obtained in example 4.

We claim:

1. In a process for preparing an electrolyte film for lithium polymer electrolyte batteries, by extruding a powder mixture comprising an amorphous polymer and a lithium salt, the improvement comprising said powder mixture containing ultra-fine powder of a metal oxide with particle sizes between about 7 and 40 nm, which mixture is effective in preventing formation of adhesive solid blocks in the powder mixture and which allows said mixture to be introduced easily in an extruder.

2. Process for preparing an electrolyte film according to claim 1, wherein said metal oxides are selected from the group consisting of silicon, aluminum and titanium oxides.

3. Process for preparing an electrolyte film according to claim 1, wherein said ultra fine powder consists of pyrogenated silica.

4. Process for preparing an electrolyte film according to claim 3, wherein said pyrogenated silica powders have a BET surface between 50 and 400 m²/g and contain more than 9.8% silica.

5. Process for preparing an electrolyte film according to claim 3, which comprises first mixing a powder of said polymer with a powder of said pyrogenated silica, separately mixing a lithium salt powder with an added quantity of said pyrogenated silica powder, combining the two powder mixtures and adding a new quantity of said pyrogenated silica powder, and finally extruding the two combined mixtures to which said pyrogenated silica powder has been added.

6. Process for preparing an electrolyte film according to claim 1, wherein 2 to 10% by weight of pyrogenated silica are used with respect to the total weight of the mixture consisting of said polymer and said salt.

7. Process for preparing an electrolyte film according to claim 6, which comprises using about 5% by weight of pyrogenated silica.

8. Process for preparing an electrolyte film according to claim 3, wherein the particles of pyrogenated silica have been chemically treated by means of silanes so as to introduce hydrophobic groups at the surface thereof.

* * * * *